US010162378B1

(12) United States Patent
Rao et al.

(10) Patent No.: US 10,162,378 B1
(45) Date of Patent: Dec. 25, 2018

(54) NEUROMORPHIC PROCESSOR FOR WIDEBAND SIGNAL ANALYSIS

(71) Applicant: HRL Laboratories, LLC, Malibu, CA (US)

(72) Inventors: Shankar R. Rao, Agoura Hills, CA (US); Peter Petre, Oak Park, CA (US); Charles E. Martin, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/631,307

(22) Filed: Jun. 23, 2017

Related U.S. Application Data

(63) Continuation-in-part of application No. 15/073,626, filed on Mar. 17, 2016, now Pat. No. 9,749,007, which is a continuation-in-part of application No. 15/452,155, filed on Mar. 7, 2017, and a continuation-in-part of application No. 15/073,626, filed on Mar. 17, 2016, now Pat. No. 9,749,007, application No. 15/631,307, which is a continuation-in-part of application No. 15/452,412, filed on Mar. 7, 2017, and a continuation-in-part of application No. 15/073,626, filed on Mar. 17, 2016, now Pat. No. 9,749,007.

(60) Provisional application No. 62/135,539, filed on Mar. 19, 2015, provisional application No. 62/304,623, filed on Mar. 7, 2016, provisional application No. 62/379,634, filed on Aug. 25, 2016.

(51) Int. Cl.
*H04B 1/00* (2006.01)
*G06F 1/08* (2006.01)

(52) U.S. Cl.
CPC .................................... *G06F 1/08* (2013.01)

(58) Field of Classification Search
CPC ........ H04B 1/719; H04B 1/71632; G06F 1/08
USPC ............. 375/350; 342/377; 381/66; 367/129
See application file for complete search history.

(56) References Cited

U.S. PATENT DOCUMENTS 5,694,474 A * 12/1997 Ngo .................... G06K 9/0057 381/66
6,691,073 B1 * 2/2004 Erten ................. G01S 7/52001 367/129

(Continued)

OTHER PUBLICATIONS

C. Igel and M. Husken, "Improving the Rprop learning algorithm", in Proc. of the 2nd Int. Symposium on Neural Computation (NC'2000), pp. 115-121, ICSC Academic Press, 2000.

(Continued)

*Primary Examiner* — Shuwang Liu
*Assistant Examiner* — Fitwi Hailegiorgis
(74) *Attorney, Agent, or Firm* — Tope-McKay & Associates

(57) ABSTRACT

Described is a neuromorphic processor for signal denoising and separation. The neuromorphic processor generates delay-embedded mixture signals from an input mixture of pulses. Using a reservoir computer, the delay-embedded mixture signals are mapped to reservoir states of a dynamical reservoir having output layer weights. The output layer weights are adapted based on short-time linear prediction, and a denoised output of the mixture of input signals us generated. The denoised output is filtered through a set of adaptable finite impulse response (FIR) filters to extract a set of separated narrowband pulses.

21 Claims, 12 Drawing Sheets
(3 of 12 Drawing Sheet(s) Filed in Color)

Input
$u(t)$
$t$
400
402
Reservoir
Trainable Readouts
406
Outputs
-Feature anomalies
-Separated signals
-De-noised input
-Signal classes
404

$$\dot{\underline{x}}(t) = F[\underline{x}(t-\underline{\tau}), \underline{u}(t)]$$

(56) References Cited

U.S. PATENT DOCUMENTS

| | | | | |
|---|---|---|---|---|
| 8,031,117 | B2 * | 10/2011 | Goldberg | H04B 7/0854 342/377 |
| 9,042,496 | B1 | 5/2015 | Su | |
| 2005/0267377 | A1 | 12/2005 | Marossero | |
| 2012/0207195 | A1 | 8/2012 | Kawasaki | |
| 2012/0232418 | A1 * | 9/2012 | Kimura | A61B 5/02411 600/528 |
| 2013/0304395 | A1 | 11/2013 | Naidu | |
| 2016/0203827 | A1 * | 7/2016 | Leff | G06T 13/40 704/207 |

OTHER PUBLICATIONS

R. Legenstein, et al. "Edge of Chaos and Prediction of Computational Performance for Neural Microcircuit Models," Neural Networks, 20(3), 2007, pp. 323-334.

W. Maass, "Liquid Computing", Proc. of the Conference CiE'07: Computability in Europe 2007, Siena (Italy), 2007, pp. 507-516.

Walden, "Analog-to-digital converter survey and analysis," IEEE J. Sel. Areas Commun., vol. 51, pp. 539-548, 1999.

H. Jaeger, et al. "Harnessing nonlinearity: Predicting chaotic systems and saving energy in wireless communications," Science, vol. 304, No. 5667, pp. 78-80, 2004.

R. Legenstein, et al. "Edge of Chaos and Prediction of Computational Performance for Neural Microcircuit Models," Neural Networks 20 (3), pp. 323-334, 2007.

W. Maass, "Liquid Computing", Proc. of the Conference CiE'07: Computability in Europe 2007, Siena (Italy), pp. 507-516.

F. Takens, "Detecting Strange Attractors in Turbulence," Dynamical Systems and Turbulence, Lecture Notes in Mathematics vol. 898, 1981, pp. 366-381.

D. Verstraeten, et al. "An experimental unification of reservoir computing methods", Neural Networks, vol. 20, No. 3, Apr. 2007, pp. 391-403.

R. Walden, "Analog-to-digital converter survey and analysis," IEEE J. Sel. Areas Commun., vol. 51, pp. 539-548, 1999.

H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.

Office Action 1 for U.S. Appl. No. 15/452,412, dated May 10, 2017.

Response to Office Action 1 for U.S. Appl. No. 15/452,412, dated Aug. 9, 2017.

Office Action 2 for U.S. Appl. No. 15/452,412, dated Nov. 14, 2017.

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.

A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.

A. Hyvarinen, "Complexity Pursuit: Separating Interesting Components from Time Series," Neural Computation, vol. 13, No. 4, pp. 883-898, Apr. 2001.

Igel, C. and Husken, M., "Improving the Rprop learning algorithm", in Proc. of the 2nd Int. Symposium on Neural Computation (NC'2000), pp. 115-121, ICSC Academic Press, 2000.

R. H. Walden, "Analog-to-digital converter survey and analysis," IEEE J. Sel. Areas Commun., vol. 51, pp. 539-548, 1999.

Office Action 1 for U.S. Appl. No. 15/073,626, dated Sep. 16, 2016.

Response to Office Action 1 for U.S. Appl. No. 15/073,626, dated Dec. 16, 2016.

Notice of Allowance for U.S. Appl. No. 15/073,626, dated Apr. 25, 2017.

Response to Office Action 2 for U.S. Appl. No. 15/452,412, dated Feb. 13, 2018.

Office Action 3 for U.S. Appl. No. 15/452,412, dated Mar. 7, 2018.

Response to Office Action 3 for U.S. Appl. No. 15/452,412, dated Jun. 6, 2018.

* cited by examiner

NEUROMORPHIC PROCESSOR FOR WIDEBAND SIGNAL ANALYSIS

CROSS-REFERENCE TO RELATED APPLICATIONS

This is a Continuation-in-Part application of U.S. application Ser. No. 15/073,626, filed in the United States on Mar. 17, 2016, entitled "Cognitive Blind Source Separator,' which is a Non-Provisional Application of U.S. Provisional Application No. 62/135,539, filed in the United States on Mar. 19, 2015, entitled, "Cognitive Blind Source Separator," the entirety of which are incorporated herein by reference.

This is ALSO a Continuation-in-Part application of U.S. application Ser. No. 15/452,155, filed in the United States on Mar. 7, 2017, entitled, "Adaptive Blind Source Separator for Ultra-Wide Bandwidth Signal Tracking," which is a Non-Provisional Application of U.S. Provisional Application No. 62/304,623, filed in the United States on Mar. 7, 2016, entitled, "Cognitive Architecture for Wideband, Low-Power, Real-Time Signal Denoising," the entirety of which are incorporated herein by reference. U.S. application Ser. No. 15/452,155 is a Continuation-in-Part application of U.S. application Ser. No. 15/073,626, filed in the United States on Mar. 17, 2016, entitled, "Cognitive Blind Source Separator," which is a Non-Provisional Application of U.S. Provisional Application No. 62/135,539, filed in the United States on Mar. 19, 2015, entitled, "Cognitive Blind Source Separator," the entirety of which are incorporated herein by reference.

This is ALSO a Continuation-in-Part application of U.S. application Ser. No. 15/452,412, filed in the United States on Mar. 7, 2017, entitled, "Cognitive Architecture for Wideband, Low-Power, Real-Time Signal Denoising," which is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which are incorporated herein by reference. U.S. application Ser. No. 15/452,412 is a Continuation-in-Part application of U.S. Non-Provisional application Ser. No. 15/073,626, filed on Mar. 17, 2016, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference.

This is ALSO a Non-Provisional Application of U.S. Provisional Application No. 62/379,634, filed in the United States on Aug. 25, 2016, entitled, "A Neuromorphic Processor for Wideband Signal Analysis," the entirety of which is incorporated herein by reference.

STATEMENT REGARDING FEDERALLY SPONSORED RESEARCH OR DEVELOPMENT

This invention was made with government support under U.S. Government Contract Number N00014-12-C-0027. The government has certain rights in the invention.

BACKGROUND OF INVENTION

(1) Field of Invention

The present invention relates to a neuromorphic signal processor and, more particularly, to a neuromorphic signal processor that combines wideband signal denoising with blind source separation.

(2) Description of Related Art

State-of-the-art systems for detecting, localizing, and classifying source emitters from passive radio frequency (RF) antennas over an ultra-wide bandwidth (>30 Gigahertz (GHz)) require high rate analog-to-digital converters (ADC). Such high-rate ADCs are expensive and power hungry, and due to fundamental physical limits (such as the Walden curve (see the List of Incorporated Literature References, Literature Reference No. 10), are not capable of achieving the sampling rate needed to capture the ultra-wide bandwidth. To mitigate this, state-of-the-art electronic warfare support (ES) systems either use spectrum sweeping (which is too slow to handle agile emitters) or a suite of digital channelizers, which have large size, weight, and power requirements. In addition, the detection, localization, and classification algorithm state-of-the-art ES systems use are typically based on the fast Fourier transform, with high computational complexity and memory requirements that make it difficult to operate them in real-time over an ultra-wide bandwidth.

Conventional method for denoising methods fall into two categories: filter-based methods and training-based approaches. Filter-based methods use filtering to smooth out noise from a signal, but are too simplistic to simultaneously maintain the low-frequency long-term trends of a signal while adapting to the high-frequency abrupt transitions. Training-based methods rely on a "dictionary" that models the signals of interest. Such a dictionary must be trained in an offline process, and requires training data that may not be available. In addition, the dictionary often requires a large amount of memory and computation to be stored and leverage on the platform, making such approaches infeasible for systems with ultra-low size, weight and power (SWaP).

Conventional methods for blind signal separation (BSS) typically require a greater number of input mixtures (which maps directly to a greater number of antenna) than the number of source signals, limiting their applicability in SWaP-constrained scenarios (see Literature Reference No. 1). Some extensions to conventional BSS have addressed the "underdetermined" scenario (with fewer mixtures than sources) that leverage prior knowledge about the sources, such as having "low complexity" or having a sparse representation with respect to a learned dictionary. Such models of prior knowledge are too broad, enabling the system to overfit an entire mixture as a single source, and require large amounts of memory to store the dictionary and computation to recover the presentation of the input mixtures with respect to the dictionary (see Literature Reference Nos. 1 and 3). In Literature Reference No. 2, they coupled the BSS algorithm with an IIR bandpass filter with tunable center frequency in order to separate temporally correlated sources. This work is still limited, requiring at least as many mixtures as sources, requiring that the mixtures be "prewhitened" to have an identity-valued covariance matrix, and using the second-order statistics of sources as the sole cue for separation.

Thus, a continuing need exists for a system that combines adaptive wideband signal denoising with single input blind source separation.

SUMMARY OF INVENTION

The present invention relates to a neuromorphic signal processor and, more particularly, to a neuromorphic signal processor that combines wideband signal denoising with blind source separation. The system comprises a neuromorphic processor and a memory having instructions such that when the instructions are executed, the neuromorphic processor performs multiple operations. Delay-embedded mixture signals are generated from an input mixture of pulses. The delay-embedded mixture signals are mapped with a reservoir computer to reservoir states of a dynamical reservoir having output layer weights. The output layer weights are tuned based on short-time linear prediction. Following adaptation of the output layer weights, a denoised output of the mixture of input signals is generated. The denoised output is filtered through a set of adaptable finite impulse response (FIR) filters to extract a set of separated narrowband pulses.

In another aspect, the neuromorphic processor iteratively adapts the output layer weights further based on a difference between a predicted sensor signal and an actual sensor signal.

In another aspect, the neuromorphic processor adapts a center frequency of each FIR filter using a combination of gradient descent and gradient-free optimization.

a neuromorphic processor and a non-transitory computer-readable medium having executable instructions encoded thereon such that when executed, the neuromorphic processor performs operations of:

generating delay-embedded mixture signals from an input mixture of pulses;

mapping, with a reservoir computer, the delay-embedded mixture signals to reservoir states of a dynamical reservoir having output layer weights;

tuning the output layer weights based on short-time linear prediction;

following adaptation of the output layer weights, generating a denoised output of the mixture of input signals; and extracting separated and denoised pulses by filtering the denoised output through a set of adaptable finite impulse response (FIR) filters.

In another aspect, tuning the output layer weights comprises iteratively adapting the output layer weights further based on a difference between a predicted signal and an actual signal.

In another aspect, filtering the denoised output further comprises adapting a center frequency of each FIR filter using a combination of gradient descent and gradient-free optimization.

In another aspect, each FIR filter extracts a unique narrowband pulse.

In another aspect, the input mixture of pulses is denoised and separated in real-time using a constraint that covers a range of electromagnetic and acoustic signals of interest.

In another aspect, each FIR filter in the set of adaptable FIR filters is adapted simultaneously.

In another aspect, wherein an adaptation mechanism limits how close the filters in the set of adaptable FIR filters are to one another.

In another aspect, the system determines when a particular FIR filter in the set of adaptable FIR filters is in a process of extracting a source signal.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
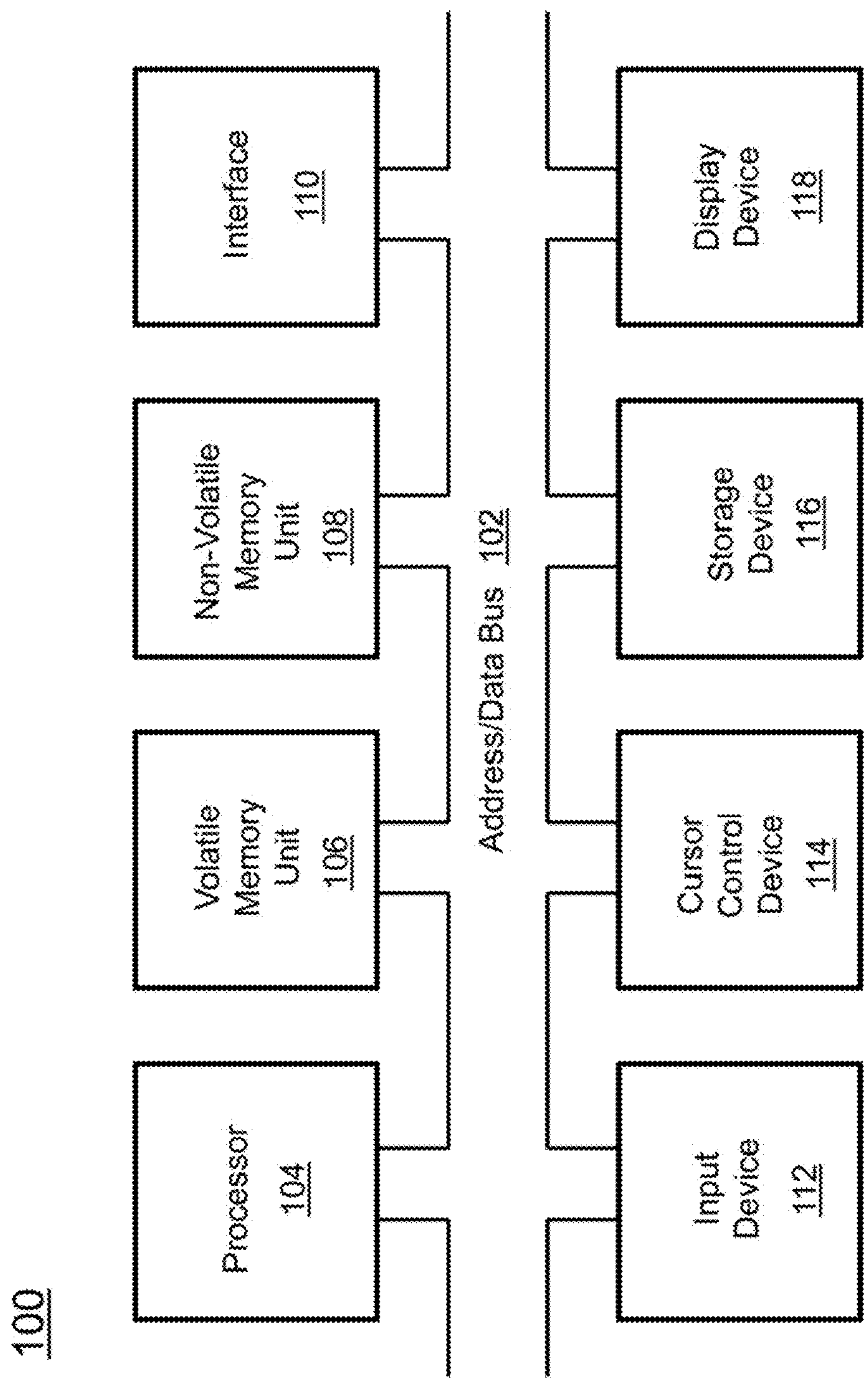
FIG. 1 is a block diagram depicting the components of a system wideband signal analysis according to some embodiments of the present disclosure.

The present invention relates to a neuromorphic signal processor and, more particularly, to a neuromorphic signal processor that combines wideband signal denoising with blind source separation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. S. Choi, A. Cichocki, H.-M. Park, and S.-Y. Lee, "Blind Source Separation and Independent Component Analysis: A Review," Neural Information Processing—Letters, Vol. 6, No. 1, January 2005.
2. A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.
3. A. Hyvarinen, "Complexity Pursuit: Separating Interesting Components from Time Series," Neural Computation, Vol. 13, No. 4, pp. 883-898, April 2001.
4. C. Igel and M. Husken, "Improving the Rprop learning algorithm", in Proc. of the 2nd Int. Symposium on Neural Computation (NC'2000), pp. 115-121, ICSC Academic Press, 2000.
5. H. Jaeger, et al. "Harnessing nonlinearity: Predicting chaotic systems and saving energy in wireless communications," Science, vol. 304, no. 5667, pp. 78-80, 2004.
6. R. Legenstein, et al. "Edge of Chaos and Prediction of Computational Performance for Neural Microcircuit Models," Neural Networks, 20(3), 2007.
7. W. Maass, "Liquid Computing", Proc. of the Conference CiE'07: COMPUTABILITY IN EUROPE 2007, Siena (Italy), 2007.
8. F. Takens, "Detecting Strange Attractors in Turbulence," Dynamical Systems and Turbulence, Lecture Notes in Mathematics Vol. 898, 1981.
9. D. Verstraeten, et al. "An experimental unification of reservoir computing methods", Neural Networks, vol. 20, no. 3, April 2007.
10. R. Walden, "Analog-to-digital converter survey and analysis," IEEE J. Sel. Areas Commun., vol. 51, pp. 539-548, 1999.
11. H. Yap, et al., "A First Analysis of the Stability of Takens' Embedding," in Proc. of the IEEE Global Conference on Signal and Information Processing (GlobalSIP) symposium on Information Processing for Big Data, December 2014.

(2) Principal Aspects

Various embodiments of the invention include three "principal" aspects. The first is a system for wideband signal analysis. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
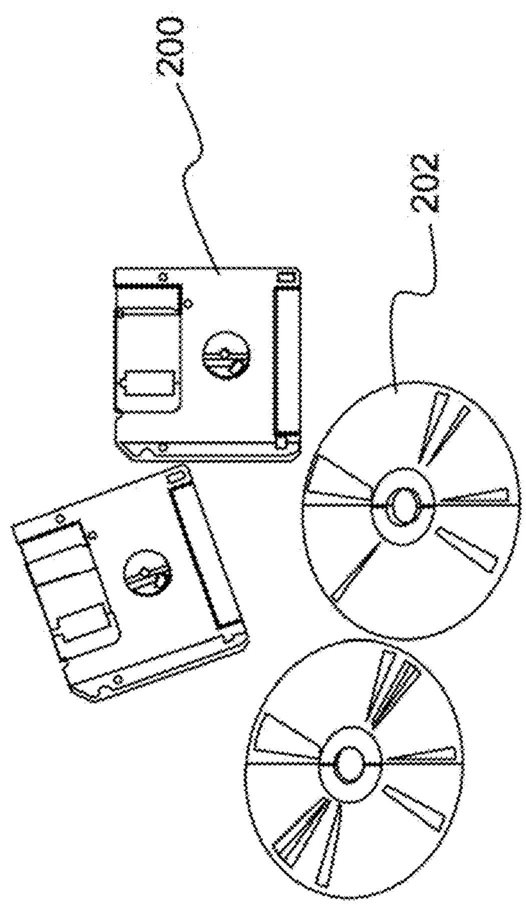
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of"instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments of the Invention

Described is a neuromorphic signal processor (NSP) that can simultaneously denoise and separate out pulses from an input signal containing a mixture of pulse waveforms over a very large (>30 Gigahertz (Ghz) bandwidth). The invention described herein takes an input signal containing a noisy mixture of multiple pulses that each have narrow instantaneous bandwidth and provides as output the separated and denoised pulses from the mixture. The NSP according to embodiments of this disclosure is implemented by combining a wideband signal denoising module (element 600) with a blind source separation (BSS) subsystem (element 700).

The BSS module (element 700) includes several unique aspects. First, the BSS module (element 700) combines methods from finite impulse response (FIR) filter theory with machine learning in order to achieve robust signal extraction using the signal representation generated by the reservoir computer (element 500). In particular, the BSS (element 700) utilizes filters (element 706) with unimodal frequency responses and adapts their center frequencies using a combination of gradient-descent and gradient-free optimization. Second, the adaptation scheme employed by the system described herein incorporates an explicit mechanism that limits how close different filters can approach one another in the frequency domain, which is used to ensure that each filter extracts a unique signal. Third, the BSS module (element 700) employs a unique method to determine when a particular filter (element 706) is in the process of extracting a source signal. This technique treats the variance of a filter's center frequency as an indicator of convergence on a source signal.

The system described in this disclosure exhibits several advantages in challenging electronic support (ES) scenarios relative to current state-of-the-art methods. First, because the NSP according to embodiments of this disclosure performs adaptive filtering, its hardware-based embodiment requires much less size, weight and power than current brute-force channelization methods. Second, it can cover an ultra-wide bandwidth of over 30 GHz and yet still exhibit very low latencies on the order of 0.1 nanoseconds. Third, the invention can perform the denoising and blind source separation operations using only a single input antenna. Fourth, the system is capable of denoising and separating pulses in real-time using a constraint that covers a wide range of electromagnetic and acoustic signals of interest.

Many other current approaches use powerful, but computationally expensive constraints, such as signal complexity measures, or rely on loose constraints, such as filter banks, which may be less computationally expensive but have limited capacity to capture the structure of real-world source signals. In contrast, the invention described herein utilizes the constraint that the waveforms of interest in a source pulse occupy a relatively narrow bandwidth and can be linearly predicted over a short interval of time, which can be computed quickly with limited computational cost.

Described below is one embodiment for the neuromorphic processor according to embodiments of the present disclosure invention that can be implemented with digital electronics (either on a field-programmable gate array (FPGA) or a custom digital application-specific integrated circuit (ASIC)). It consists of a signal denoising module followed by a blind source separation (BSS) module. One could instantiate the invention with either analog or mixed-signal complementary metal-oxide-semiconductor (CMOS) circuit by leveraging neuromorphic circuit technology.

(3.1) Signal Denoising Module (Element 600)

Described in detail below is a signal denoising system, based on U.S. application Ser. No. 15/452,412 (which is hereby incorporated by reference as though fully set forth herein), that takes as input a signal that is a noisy mixture of pulses over a wide bandwidth and produces a "denoised" output signal that preserves all of the pulses in the mixture but significantly increases the signal-to-noise ratio (SNR).

The signal denoising module (element 600) consists of three primary components. The first component is a delay embedding. The mixture signals that form the input to the signal denoising module (element 600) are continuously passed through the delay embedding, which creates a finite temporal record of the input signal.

The second component is a reservoir computer (RC) (element 500), which is the "neuromorphic" or brain-inspired aspect of the invention. The dynamic reservoir computer (element 500) accepts the delay-embedded mixture signals (elements 605 and 607) as input. It maps this input to a high-dimensional dynamical system known as the dynamic reservoir (element 402). The RC (element 500), has a predefined number of outputs, which are generated by continually mapping the reservoir states through a set of distinct linear functions, with one such function defined per output.

The third component is a weight adaptation module (element 608) that adapts the output of the reservoir (element 402) via gradient descent to produce a prediction of the input signal (element 616) a small time step in the future. Since the noise in the input signal is inherently random and unpredictable, the predicted input signal (element 616) will be free of noise (i.e., denoised output 610). The error (element 614) between the predicted input signal (element 616) and actual input (element 618) is used by the weight adaptation module (element 608) to further tune the output weights (element 609) of the reservoir (element 402) in an iterative process.

Figure 3:
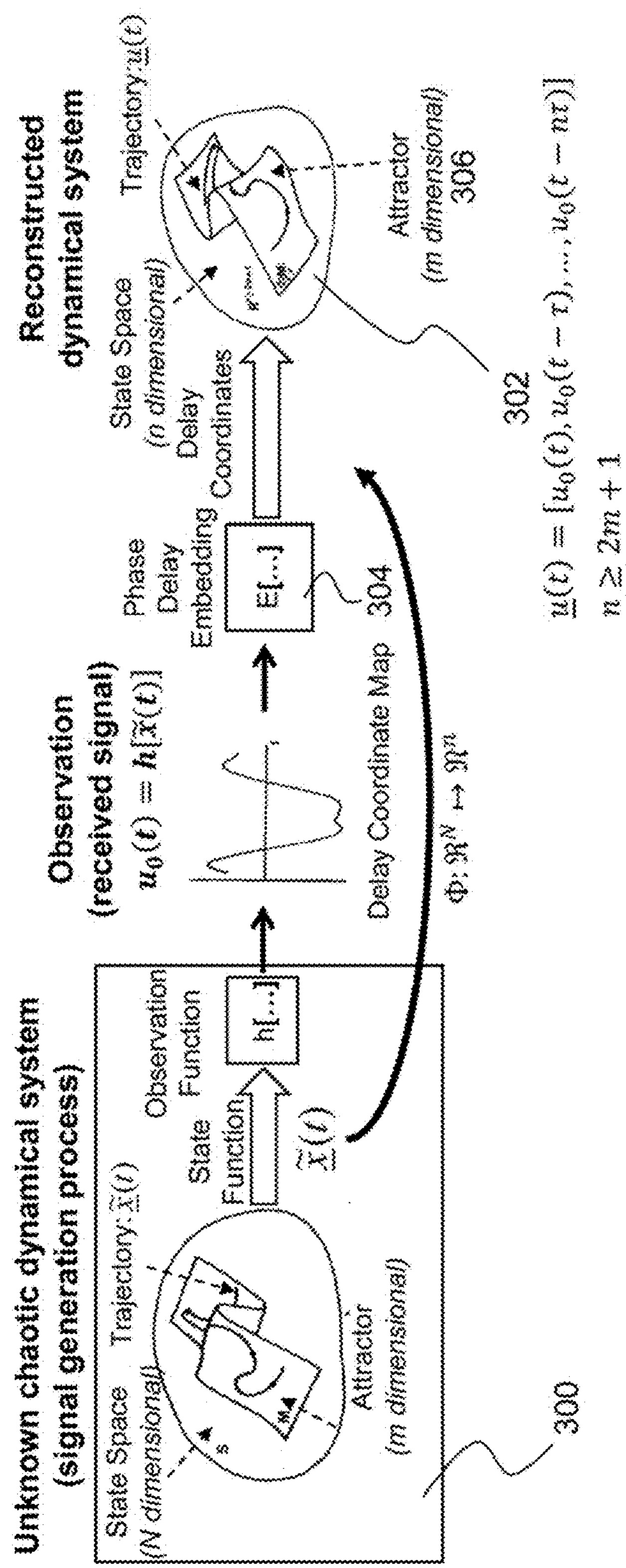
FIG. 3 is an illustration of an unknown dynamical system reconstructed from delayed observations according to prior art.

Phase delay embedding is a technique developed in dynamical system theory to model the dynamics of a chaotic system from its observation $u_0(t)$ using delayed versions of the observation as new input vector $\underline{u}(t)$. According to Taken's embedding theorem (see Literature Reference No. 7) and Yap et al. (see Literature Reference No. 10), the topology and geometry of an unknown (chaotic) dynamical system can be reconstructed from a sufficient number of delayed observations. As shown in FIG. 3, it is supposed that an unknown (potentially chaotic) dynamical system (element 300) embedded in an N-dimensional state space 302 (through phase delay embedding 304) has an m-dimensional attractor 306. This means that though the state space has N parameters, signals from the dynamical system (element 300) form trajectories that all lie on an m-dimensional sub-manifold M of the state space, and can theoretically (though not practically) be specified by as few as m parameters. The observations (received signal) $u_0(t)=h[\tilde{\underline{x}}(t)]$ is a projection of the state space.

The phase delay embedding 304 produces a new input vector $\underline{u}(t)$ from n delayed versions of the observation signal $u_0(t)$ concatenated together. According to Taken's theorem (see Literature Reference No. 8), given fairly broad assumptions on the curvature of the sub-manifold M and the nondegenerate nature of the projection h[.], if the number of delay coordinate dimensionality n>2m+1, then the phase delay embedding $\underline{u}(t)$ preserves the topological structure (i.e., shape) of the dynamical system, and thus can be used reconstruct the dynamical system from observations. More recent work in Literature Reference No. 11 shows that the delay coordinate dimensionality can be increased more (but still not a function of the ambient dimensionality N) to be able to preserve both the topology and geometry of the dynamical system, without complete knowledge of the dynamical system or the observation function.

Figure 4:
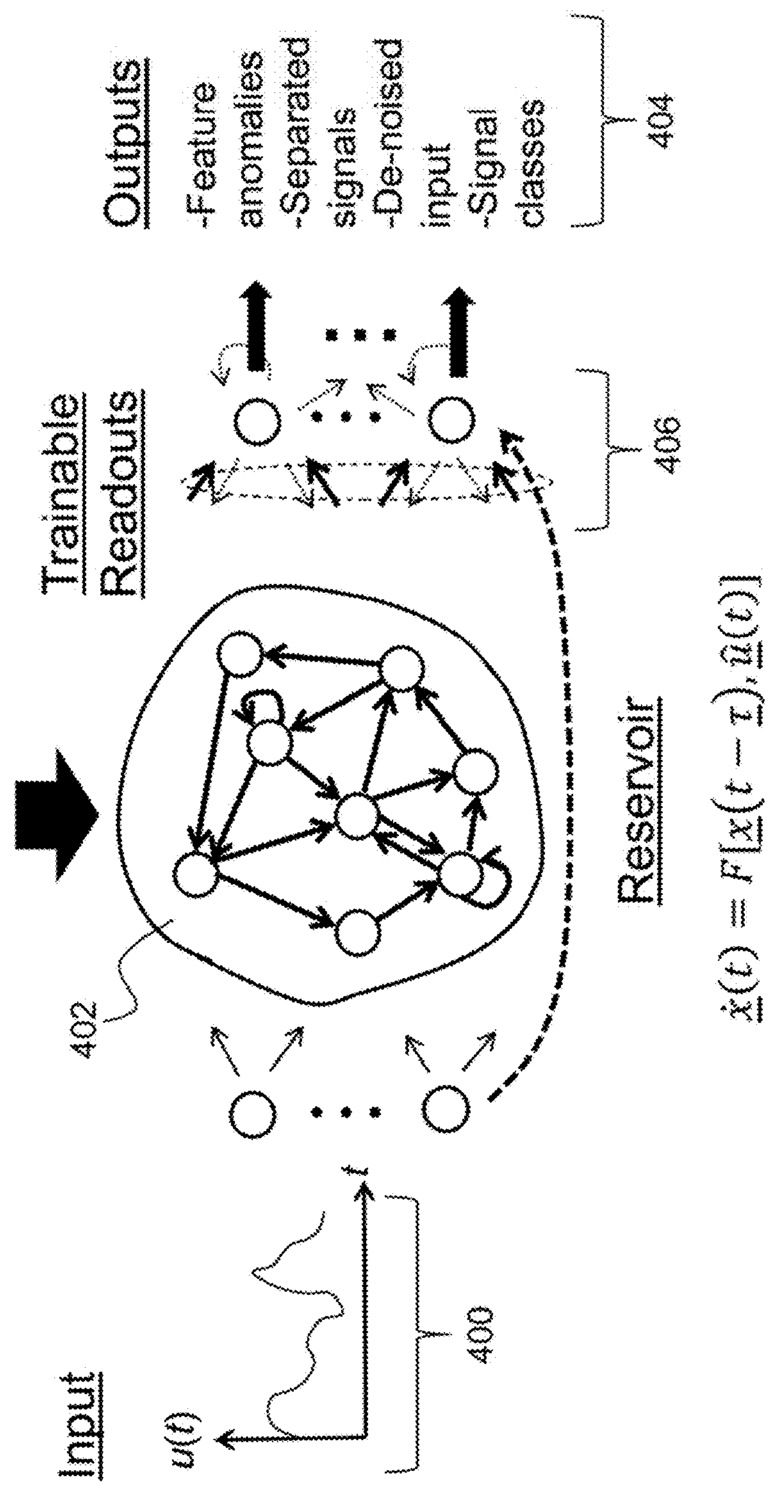
FIG. 4 is an illustration of a reservoir computer mapping an input signal vector to a high-dimensional state-space according to embodiments of the present disclosure.

The signal denoising module (element 600) according to embodiments of the present disclosure uses a form of neuromorphic signal processing known as reservoir computing (RC) (see Literature Reference Nos. 5-7 and 9 for a description of reservoir computing). As depicted in FIG. 4, a reservoir computer maps an input signal vector 400 to a high-dimensional state-space 402 that models the underlying time-varying dynamics of the signal generation process. The reservoir states can be mapped to useful outputs 404, including denoised inputs, signal classes, separated signals, and anomalies using trainable linear readout layers 406.

Reservoir computing is a special form of a recurrent neural network (a neural network with feedback connections) that operates by projecting the input signal vector (element 400) into a high-dimensional reservoir state space (element 402), which contains an equivalent dynamical model of the signal generation process capturing all of the available and actionable information about the input (element 400). A reservoir (element 402) has readout layers 406 that can be trained, either off-line or on-line, to learn desired outputs 404 by utilizing the state functions. Outputs 404 of the trainable readouts 404 include, but are not limited to, feature anomalies, separated signals, de-noised inputs, and signal classes. Non-limiting examples of signal classes include sinusoids (pure tones), chirps, amplitude modulated (AM) signals, and frequency modulated (FM) signals.

The system described herein is continuously predicting the input signal (element 616) as a means of denoising it. If the dynamics of the input signal change suddenly, then the prediction error (element 614) will momentarily spike. The spike in the prediction error (element 614) can be used as an output of the trainable readouts to indicate that an anomaly has occurred, which is referred to here as feature anomalies (element 612). Thus, RC has the power of recurrent neural networks to model non-stationary (time-varying) processes and phenomena, but with simple readout layers 406 and training algorithms that are both accurate and efficient. It can be shown that a reservoir computer (element 500) can implement an adaptable, non-linear state-space filter (see Literature Reference Nos. 5 and 7).

Thus, given that the delay embedded observations can effectively model dynamical system behavior, and a reservoir (element 402) can implement an adaptable state-space filter, by combining a phase delay embedding with a reservoir computer (element 500), the signal denoising system (element 600) according to embodiments of the present disclosure leverages the time evolution of these new state variables to perform short term predictions of the observations. The signal denoising module (element 600) uses a dynamic reservoir (element 402) to learn the prediction function F:

$$\tilde{u}_0(t+\tau)=F[u_0(t),u_0(t-\tau),u_0(t-2\tau), \ldots ,u_0(t-n\tau)],$$

where u(t) is the input signal at time instant t, n is the size of the phase delay embedding, $\tau$ is the length of delay between elements in the embedding, and $\tilde{u}(t)$ is the predicted value of the input signal at time t.

Figure 5:
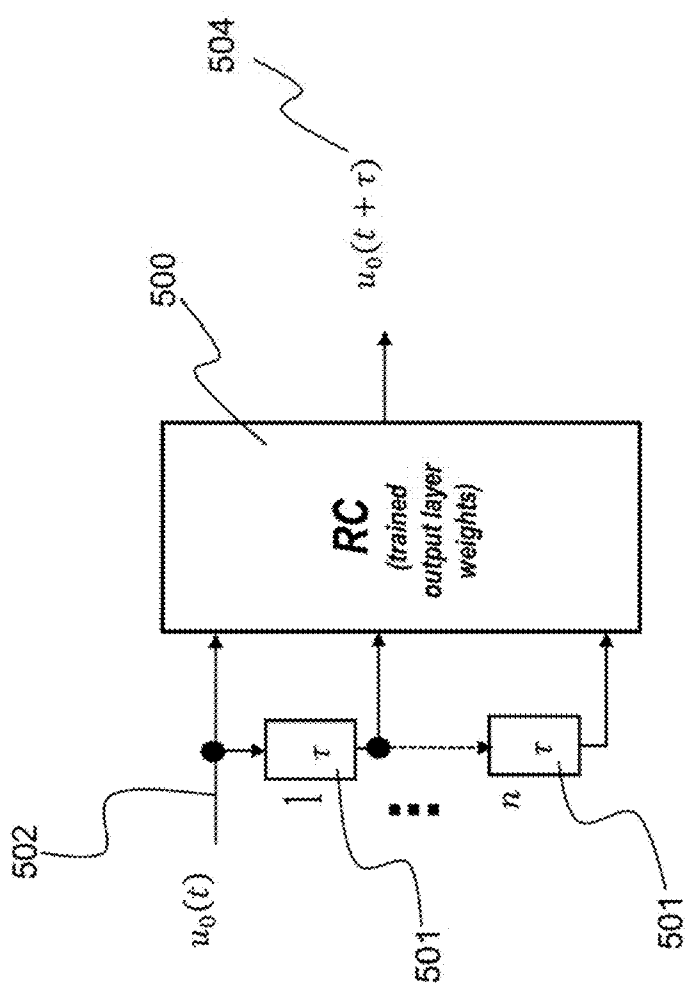
FIG. 5 is an illustration of a dynamic reservoir according to embodiments of the present disclosure.

Augmenting reservoir computing with phase delay embedding enables real-time signal prediction. In FIG. 5, boxes 501 represent delay elements that take an input $u_0(t)$ (element 502) and delay it in time by $\tau$, resulting in output $u_0(t+\tau)$ (element 504). The '1' and 'n' specify that the delay embedding consists of n consecutive delay elements. The dynamic reservoir computer 500 illustrated in FIG. 5 satisfies the following set of coupled ordinary differential equations (ODE):

$$\dot{\underline{x}}\pm(t)=\underline{\underline{A}}\underline{x}(t)+\underline{\underline{B}}\underline{u}(t),$$

$$y(t)=\underline{C}(t)^T\underline{x}(t)+\underline{D}(t)^T\underline{u}(t).$$

Here, $\underline{\underline{A}}$ is an m×m matrix specifying the set of mixing weights that govern the reservoir dynamics, $\underline{\underline{B}}$ is an m×n weight matrix that maps the input into the reservoir, and $\underline{C}$ and $\underline{D}$ are adaptable mixing weight vectors, of dimensionalities m and n, applied to the state and input to produce the output signal y(t). The mixing weights $\underline{\underline{A}}$ and $\underline{\underline{B}}$ are often generated randomly in conventional reservoir computing system, but can also be generated deterministically to be tailored to a particular application scenario.

To perform short-time linear prediction of the input signal $u_0(t)$ (element 502), the signal denoising module (element 600) uses an online gradient descent algorithm. The idea is to enforce exact prediction of the current time point that is used in the delay embedding. The predicted input value at time $u_0(t+\tau)$ (element 504) is calculated from the current value of the output weights ($\underline{C}(t)$, $\underline{D}(t)$) and the current and past values of the states ($\underline{x}$) and the input ($\underline{u}$). The quadratic error function to be minimized is given by:

$$E[\underline{C},\underline{D}\doteq](u_0(t)-y(t-\tau))^2+\lambda_C\|\underline{C}(t)\|^2+\lambda_D\|\underline{D}(t)\|^2,$$

where $\lambda_C$ and $\lambda_D$ are parameters that weight the importance of the output weights $\underline{C}$ and $\underline{D}$.

To minimize the quadratic error E[$\underline{C}$,$\underline{D}$], the gradients of E[$\underline{C}$,$\underline{D}$] are computed with respect to $\underline{C}$ and $\underline{D}$. Based on these gradients, the weight updates to $\underline{C}(t)$ and $\underline{D}(t)$ satisfy the following ODEs:

$$\dot{\underline{C}}(t)=-g_C\underline{C}(t)+\mu_C\varepsilon(t)\underline{x}(t)$$

$$\dot{\underline{D}}(t)=-g_D\underline{D}(t)+\mu_D\varepsilon(t)\underline{u}(t),$$

where $g_C=2\lambda_C$ and $g_D=2\lambda_D$ is the "forgetting" rates with respect to $\underline{C}$ and $\underline{D}$, $\mu_c$ and $\mu_d$ are the learning rates with respect to $\underline{C}$ and $\underline{D}$, and $\varepsilon(t)\doteq u_0(t)-y(t-\tau)$ is the error signal (element 614).

The ODEs for the dynamic reservoir (element 402) and the weight adaptation system (element 608) can be implemented directly in analog hardware. To implement the above ODEs in software or efficient digital hardware (e.g., field-programmable gate arrays (FPGAs) or custom digital application-specific integrated circuits (ASICs)), the update equations must be discretized. For implementing the signal denoising module (element 600) on digital devices, the first-order approximation $f(t+\Delta t)\approx f(t)+\Delta t\dot{f}(t)$ is used, where $\Delta t$ is the discretization step size. Based on the first-order approximation, and using the discretized notation $f[n]=f(n\Delta t)$, the following iterative updates for the state ($\underline{x}$), output (y), and weights ($\underline{C}$,$\underline{D}$) are obtained:

$$\underline{x}[n]=\underline{\underline{A}}\underline{x}[n-1]+\underline{\underline{B}}\underline{u}[n]$$

$$\varepsilon[n]=u_0[n]-y[n-1]$$

$$\underline{C}[n]=(1-\Delta tg_C)\underline{C}[n-1]+\Delta t\mu_C\varepsilon[n]\underline{x}[n]$$

$$\underline{D}[n]=(1-\Delta tg_D)\underline{D}[n-1]+\Delta t\mu_D\varepsilon[n]\underline{u}[n]$$

$$y[n]=\underline{C}[n]^T\underline{x}[n]+\underline{D}[n]^T\underline{u}[n].$$

Figure 6:
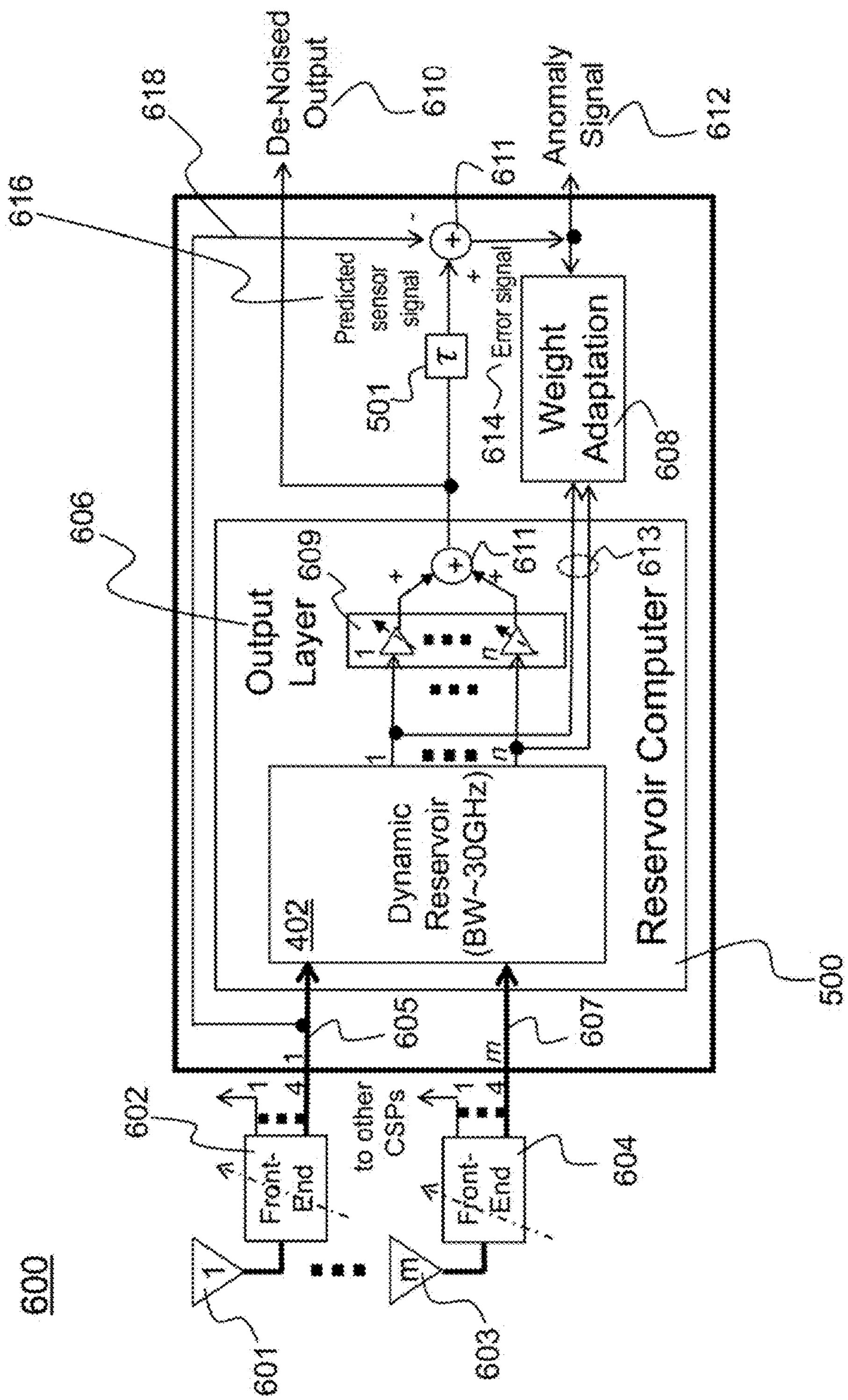
FIG. 6 is an illustration of the architecture for wideband signal denoising according to embodiments of the present disclosure.

The complete architecture of the signal denoising module 600 for wideband signal denoising, which combines a dynamic reservoir 402 with short-time linear prediction, is shown in FIG. 6. From m antennae 601 and 603 capturing wideband (~30 GHz) analog input signals, wideband analog-to-digital converter (ADC) frontends 602 and 604 provide input to the dynamic reservoir (FIG. 4, element 402). The m digitized outputs 605 and 607 of the m ADC frontends 602 and 604 are fed as input to the dynamic reservoir 402. The output layer 606 weights of the reservoir computer 500 are adapted (weight adaptation 608) based on short-time prediction to denoise the input signal. Tunable output mixing weights 609 are adapted using the weight adaption 608 module. Circles with plus signs inside (element 611) represent summation operations. Loop 613 designates that dynamic reservoir state outputs 1, . . . , n are fed as input to the weight adaptation 608 module. The result is a denoised output 610 and/or an anomaly signal 612. As described above, an error signal 614 between the predicted sensor signal 616 and the actual sensor signal 618 is used by the weight adaptation module (element 608) to further tune the output weights of the dynamic reservoir 402 in an iterative process. The actual sensor signal 618 is the digitized output of the frontend (element 602), and it is subtracted from the prediction signal 616 to obtain the error signal 614.

(3.2) Blind Source Separation Module (Element 700)

Described in detail below is an instantiation of a BSS subsystem (element 700), based on U.S. application Ser. No. 15/073,626 (which is hereby incorporated by reference as though fully set forth herein), used as part of the neuromorphic processor described herein. It takes as input the denoised output signal (element 610) from the reservoir (element 402) that is a mixture of pulses over a wide bandwidth, where each pulse in the mixture has relatively narrow instantaneous bandwidth. A non-limiting example of an embodiment is described in U.S. application Ser. No.

15/452,155 (which is hereby incorporated by reference as though fully set forth herein).

Figure 7:
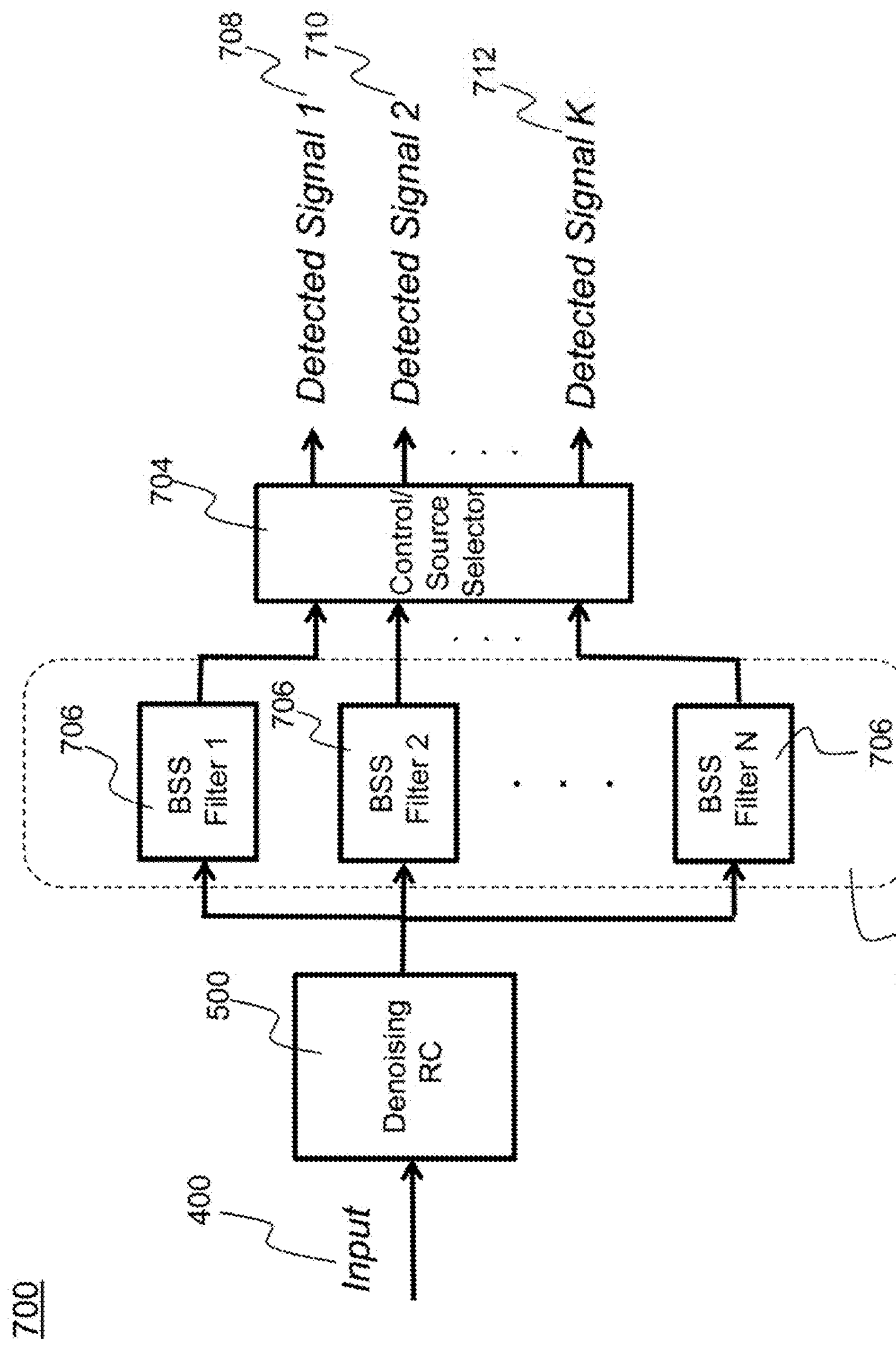
FIG. 7 is an illustration of the architecture of the blind source separation (BSS) system according to embodiments of the present disclosure.

FIG. 7 depicts the architecture of the blind source separation (BSS) system 700 according to embodiments of the present disclosure. The system takes an input signal that has been denoised by the reservoir computer 500 and feeds it into a set of N tunable FIR filters (element 702). The filter outputs are then fed into a control/source selector 704 which ensures that no two filters track the same source signal. The BSS system 700 separates narrowband pulses in a mixture signal (input 400) using a set of adaptable FIR filters 702. The only constraint on the type of filter is that it must have a unimodal gain response in the frequency domain, though ripple is acceptable. A Gaussian filter is an example of an acceptable FIR filter type. The center frequency of each filter 706 is adaptable. As a mixture signal (input 400) is run through the network of filters (element 702), these parameters are adapted in such a way that the center frequency of each filter 706 converges on the frequency of a unique source signal. In essence, the filters 702 act as constraints on the outputs of the nodes in the output layer, forcing them to extract a single source signal (e.g., detected signal 1 (element 708), detected signal 2 (element 710), detected signal K (element 712)) from the mixture (input 400). The frequency of a source signal may be a function of time.

Figure 8:
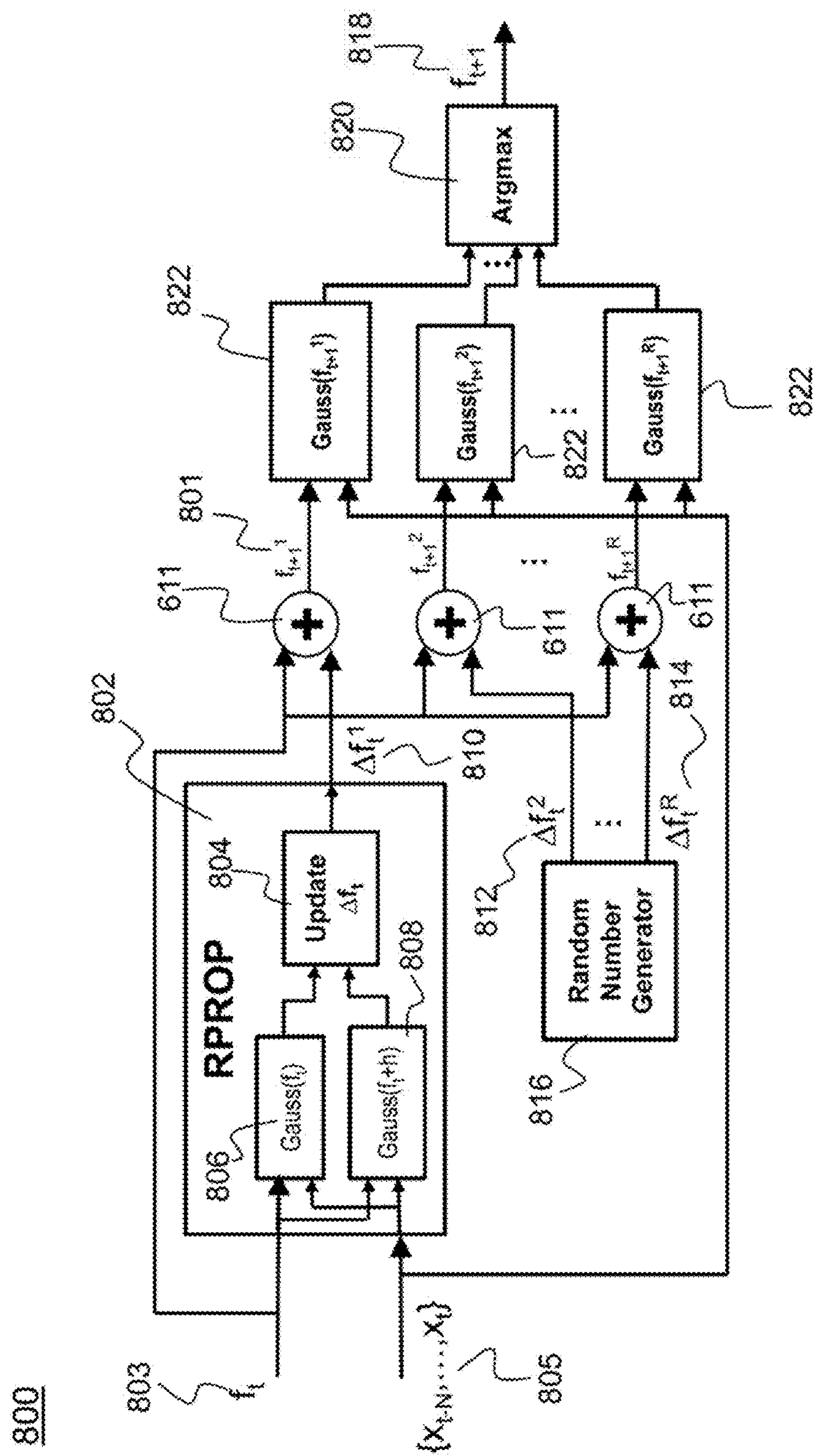
FIG. 8 is an illustration of the architecture of the hybrid frequency update system according to embodiments of the present disclosure.

FIG. 8 shows the architecture of the hybrid frequency update module 800 used to adapt the filters 702 in the BSS system 700 to changing source signals. $f_t$ (element 803) denotes the center frequency of a BCC filter (e.g., element 706, FIG. 7) at time t. $\{x_{t-N}, \ldots, x_t\}$ (element 805) represents the N+1 most recent samples from the output of the denoising RC (element 500). An RPROP submodule 802 determines a center frequency update (element 804) using the sequence filter gradients (elements 806 and 808). The RPROP frequency update (element 810) is compared to a number of random frequency updates (elements 812 and 814) from a random number generator 816, and the update (element 818) that maximizes the filter output power is selected (via an argmax function 820). Each box (element 822) labeled "Gauss($f^i$)" computes the summed filter output power $p(x,f^i)$ over the last N samples at time t, given by $$p(x, f^i) = \sum_{n=t-N}^{t} (h(f^i) * x(n))^2,$$

where x is the input signal, $h(f^i)$ is the Gaussian FIR filter with fixed bandwidth and center frequency $f^i$. As described above, the hybrid frequency update module 800 compares the center frequency update provided by the gradient descent-based approach (RPROP submodule 802) and randomized frequency updates (elements 812 and 814) and selects the update $f_{t+1}{}^i$ that maximizes the filter output. As depicted in FIG. 8, there is a center frequency $f_{t+1}{}^1$ (element 801) generated by RPROP and (R−1) center frequencies $f_{t+1}{}^2 \ldots f_{t+1}{}^R$ generated by the random number generator 816. For each of these, a Gaussian FIR filter (element 822) is constructed with that center frequency, the filter is applied to the current set of input samples, and the output power of each filter is calculated. The center frequency $f_{t+1}{}^i$ that results in the maximum filter output is selected as $f_{t+1}$ (element 818), the next center frequency of the BSS filter, which is the adapted center frequency of the BSS filter (e.g., element 706, FIG. 7) at time t+1.

The hybrid gradient descent-based approach and randomized adaptation/gradient-free mechanism (element 816) enables the BSS module 700 to find source signals over an ultra-wide (80 Ghz+) search bandwidth and enables the use of very narrow bandwidth filters to isolate multiple sources signals that are relatively close in frequency. This hybrid adaptation mechanism also allows simultaneous adaptation of many filters without restricting filter movements, and the randomized updates are highly parallelizable.

For the gradient descent approach, the BSS module described herein uses the RPROP algorithm (see Literature Reference No. 4), represented by element 802. RPROP (element 802) uses only the sign information of the gradient rather than its magnitude, making it favorable for limited precision hardware implementation. The RPROP update is given by $$f_{t+1} = f_t - d_t f_t,$$

where $d_t = \text{sgn}(p(x,f_t+\varepsilon) - p(x,f_t))$ is the sign of the derivative of the filter output power, and Aft is the frequency increment. $\Delta f_t$ (element 804) is determined by the sequence of sign changes of the output power derivative:

$$\Delta f_t = \begin{cases} \min(\mu_+(f_t - f_{t-1}), \Delta f_{max}) & d_t \cdot d_{t-1} > 0 \\ \max(\mu_-(f_t - f_{t-1}), \Delta f_{min}) & d_t \cdot d_{t-1} = 0 \\ f_t - f_{t-1} & d_t \cdot d_{t-1} = 0 \end{cases},$$

where $\mu_+$, $\mu_-$, $\Delta f_{max}$, and $\Delta f_{min}$ are user-defined parameters that determine the dynamics of the RPROP update. The randomized frequency updates (elements 812 and 814) are sampled from a zero-mean Gaussian random variable, where the variance σ is a user-specified parameter.

(3.3) Experimental Studies

FIGS. 9A-9D illustrate results of the neuromorphic signal processor on a simulated mixture of 80 short pulses and 1 long pulse in a 0 dB signal environment with 80% of the pulses overlapping. The system described herein detected all significant pulses and 46 out of 75 pulses that were below the 12 dB noise floor of conventional channelizing systems. FIGS. 9A-9D illustrate results for a noisy mixture signal that consisted of many diverse linearly mixed source signals. This scenario represents an extremely cluttered signal environment. It contained 80 short pulses and 1 long pulse contained within an ultra-wide 30 GHz bandwidth. With the exception of the long pulse, which spanned the duration of the signal, the maximum duration of the pulses was only 100 nanoseconds (ns). This short duration made detecting and extracting the pulses more challenging. Furthermore, to make extracting the pulses even more difficult, the scenario was set up such that 80% of the pulses overlapped at least one other pulse. The pulses had a wide range of modulations including various Barker codings, chirps with different rates, amplitudes with different shaped envelopes, and a variety of durations. A conventional channelizer-based approach would require a number of 80 megahertz (MHz) channelizer to capture the 30 GHz bandwidth, and within an 80 MHz band, a conventional channelizer would only be able to detect pulse above a 12 decibel (dB) noise floor.

Figure 9A:
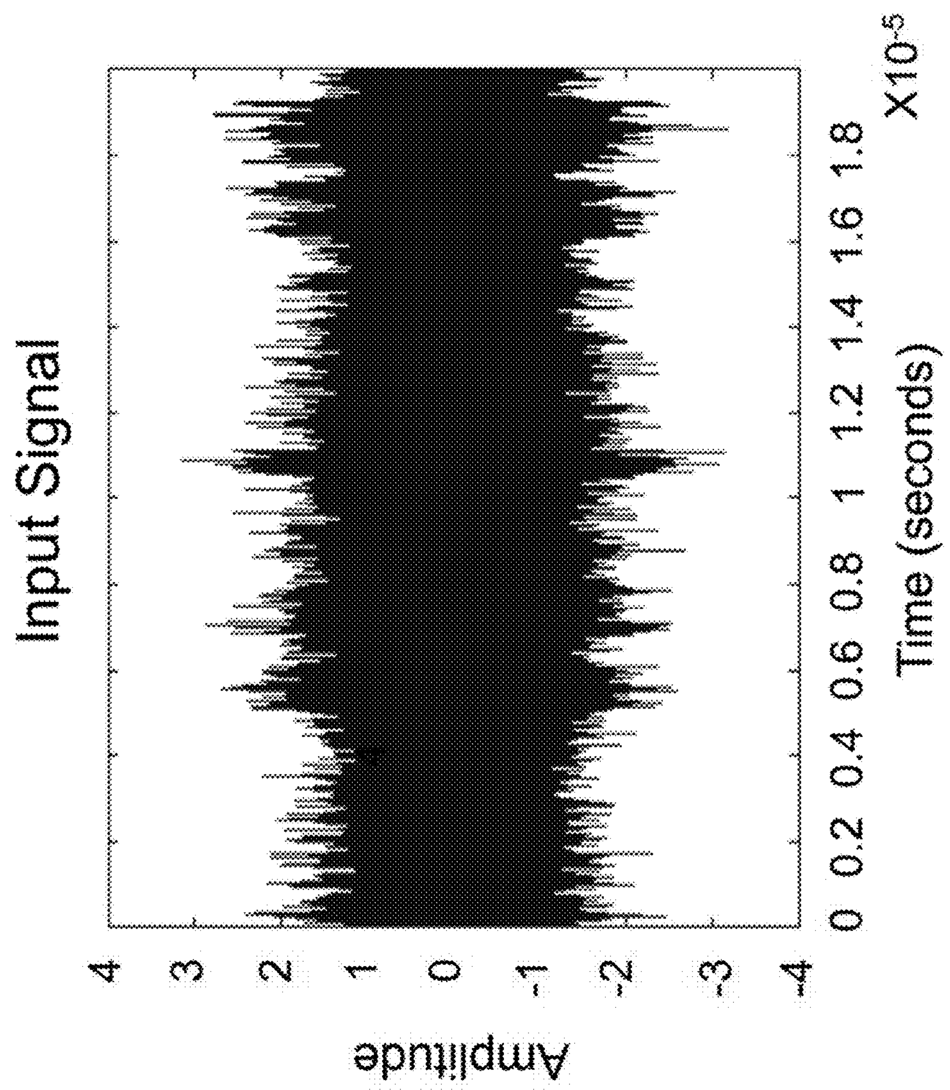
FIG. 9A is an illustration of a mixture signal according to embodiments of the present disclosure.
Figure 9B:
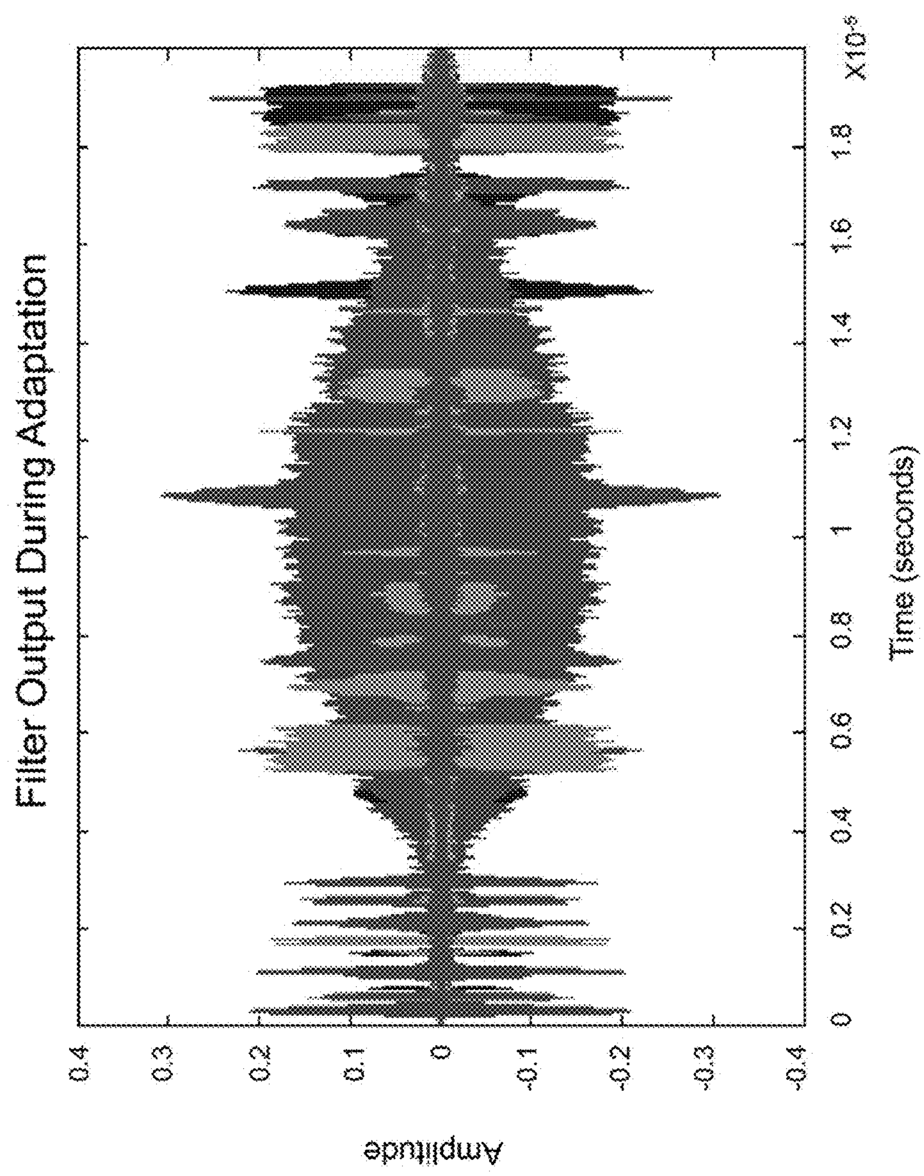
FIG. 9B is an illustration of extracted pulses from the mixture signal of FIG. 9A according to embodiments of the present disclosure.
Figure 9C:
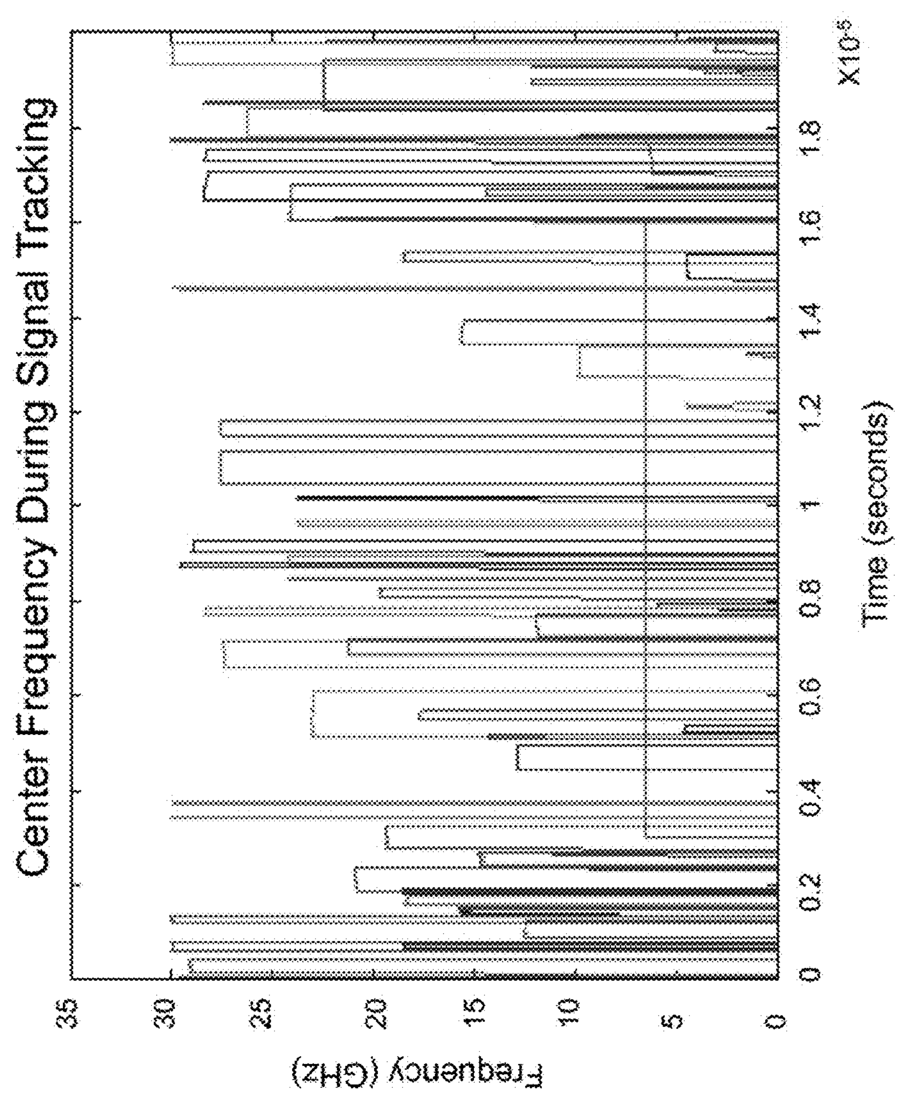
FIG. 9C is an illustration of center frequencies of the filters during the extraction process according to embodiments of the present disclosure.
Figure 9D:
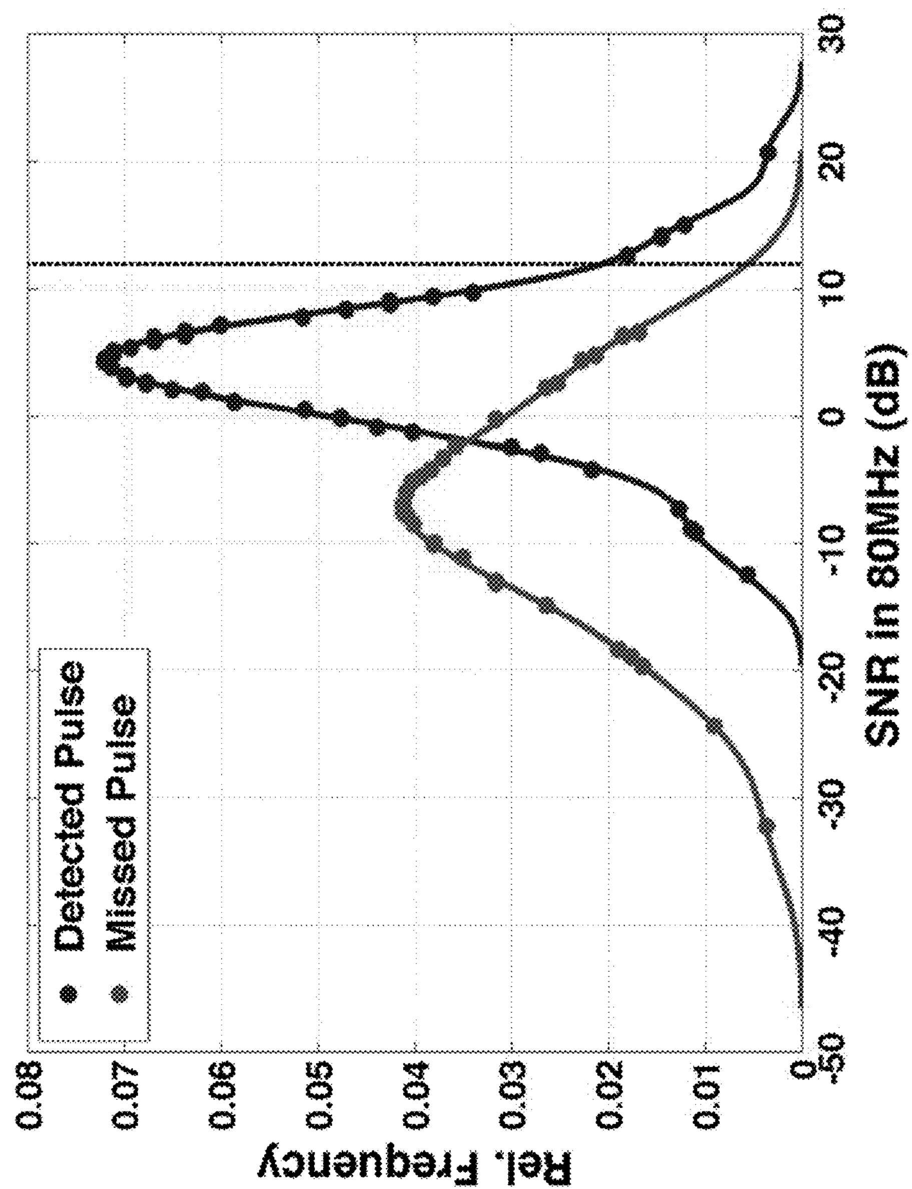
FIG. 9D is an illustration of the signal-to-noise ratio (SNR) distribution of detected and missed pulses according to embodiments of the present disclosure.

The input mixture signal, which is shown in FIG. 9A, had a 0 dB signal-to-noise ratio and, thus, contained only 5 pulses above the noise floor. The extracted pulses are shown in FIGS. 9B and 9C, depicting the center frequencies of the filters during the extraction process. FIG. 9B depicts the BSS system filter output (where each input signal is represented by a distinct color), and FIG. 9C shows the tracked center frequencies (where each frequency is represented by a distinct color). As illustrated in FIG. 9D, the invention extracted all 5 significant pulses that were above the noise floor, and was able to extract a majority (46 of 75) of pulses that were below the noise floor.

In summary, the invention described herein combines an adaptive wideband signal denoising system (element 600) with a single input blind source separation system (element 700). These innovations enable the system to significantly denoise (>20 dB noise removed) and separate multiple temporally correlated RF signals over an ultra-wide bandwidth (>30 Ghz) using as little as a single antenna. The low complexity and memory requirements of the algorithms disclosed herein enable the invention to be developed on low-power hardware, including field-programmable gate arrays (FPGAs) and custom digital application-specific integrated circuits (ASICs).

The system according to embodiments of the present disclosure is directly applicable to electronic warfare systems, particularly Electronic Support Measures (ESM) receivers. For instance, the invention according to this disclosure can be used to develop ESM systems that can perform real-time processing of signals over an ultra-wide bandwidth. The invention described herein provides expanded situational awareness, providing the core functionality required for ultra-low latency signal detection and analysis over a 30 Ghz instantaneous bandwidth to enable real-time resource allocation based on the RF environment. This performance can be achieved on computing platforms with orders of magnitude lower size, weight, and power.

The neuromorphic signal processor described in this invention is also applicable to vehicle applications, enabling cognitive radio in low signal-to-noise ration (SNR) conditions. It can also be used in vehicle manufacturing, helping to significantly denoise the control signal used for automated welding in the factory.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for wideband signal analysis, the system comprising:

a neuromorphic processor and a non-transitory computer-readable medium having executable instructions encoded thereon such that when executed, the neuromorphic processor performs operations of:

generating delay-embedded mixture signals from a mixture of pulses from a single input;

mapping, with a reservoir computer, the delay-embedded mixture signals to reservoir states of a dynamical reservoir having output layer weights;

tuning the output layer weights based on short-time linear prediction;

following adaptation of the output layer weights, generating a denoised output of the mixture of input signals; and extracting separated and denoised pulses by filtering the denoised output through a set of adaptable finite impulse response (FIR) filters, wherein an adaptation mechanism limits how close the filters in the set of adaptable FIR filters are to one another.

2. The system as set forth in claim 1, wherein tuning the output layer weights comprises iteratively adapting the output layer weights further based on a difference between a predicted signal and an actual signal.

3. The system as set forth in claim 1, wherein filtering the denoised output further comprises adapting a center frequency of each FIR filter using a combination of gradient descent and gradient-free optimization.

4. The system as set forth in claim 1, wherein each FIR filter extracts a unique narrowband pulse.

5. The system as set forth in claim 1, wherein the input mixture of pulses is denoised and separated in real-time using a constraint that covers a range of electromagnetic and acoustic signals of interest.

6. The system as set forth in claim 1, wherein each FIR filter in the set of adaptable FIR filters is adapted simultaneously.

7. The system as set forth in claim 1, wherein the one or more processors further perform an operation of determining when a particular FIR filter in the set of adaptable FIR filters is in a process of extracting a source signal.

8. A computer program product for wideband signal analysis, the computer program product comprising:

a non-transitory computer-readable medium having executable instructions encoded thereon, such that upon execution of the instructions by one or more processors, the one or more processors perform operations of:

generating delay-embedded mixture signals from a mixture of pulses from a single input;

mapping, with a reservoir computer, the delay-embedded mixture signals to reservoir states of a dynamical reservoir having output layer weights;

tuning the output layer weights based on short-time linear prediction;

following adaptation of the output layer weights, generating a denoised output of the mixture of input signals; and extracting separated and denoised pulses by filtering the denoised output through a set of adaptable finite impulse response (FIR) filters, wherein an adaptation mechanism limits how close the filters in the set of adaptable FIR filters are to one another.

9. The computer program product as set forth in claim 8, wherein tuning the output layer weights comprises iteratively adapting the output layer weights further based on a difference between a predicted signal and an actual signal.

10. The computer program product as set forth in claim 8, wherein filtering the denoised output further comprises adapting a center frequency of each FIR filter using a combination of gradient descent and gradient-free optimization.

11. The computer program product as set forth in claim 8, wherein each FIR filter extracts a unique narrowband pulse.

12. The computer program product as set forth in claim 8, wherein the input mixture of pulses is denoised and separated in real-time using a constraint that covers a range of electromagnetic and acoustic signals of interest.

13. The computer program product as set forth in claim 8, wherein each FIR filter in the set of adaptable FIR filters is adapted simultaneously.

14. The computer program product as set forth in claim 8, further comprising instructions for causing the one or more processors to further perform an operation of determining when a particular FIR filter in the set of adaptable FIR filters is in a process of extracting a source signal.

15. A computer implemented method for wideband signal analysis, the method comprising an act of:

causing one or more processors to execute instructions encoded on a non-transitory computer-readable medium, such that upon execution, the one or more processors perform operations of:

generating delay-embedded mixture signals from a mixture of pulses from a single input;

mapping, with a reservoir computer, the delay-embedded mixture signals to reservoir states of a dynamical reservoir having output layer weights;

tuning the output layer weights based on short-time linear prediction;

following adaptation of the output layer weights, generating a denoised output of the mixture of input signals; and extracting separated and denoised pulses by filtering the denoised output through a set of adaptable finite impulse response (FIR) filters, wherein an adaptation mechanism limits how close the filters in the set of adaptable FIR filters are to one another.

16. The method as set forth in claim 15, wherein tuning the output layer weights comprises iteratively adapting the output layer weights further based on a difference between a predicted signal and an actual signal.

17. The method as set forth in claim 15, wherein filtering the denoised output further comprises adapting a center frequency of each FIR filter using a combination of gradient descent and gradient-free optimization.

18. The method as set forth in claim 15, wherein each FIR filter extracts a unique narrowband pulse.

19. The method as set forth in claim 15, wherein the input mixture of pulses is denoised and separated in real-time using a constraint that covers a range of electromagnetic and acoustic signals of interest.

20. The method as set forth in claim 15, wherein each FIR filter in the set of adaptable FIR filters is adapted simultaneously.

21. The method as set forth in claim 15, wherein the one or more processors further perform an operation of determining when a particular FIR filter in the set of adaptable FIR filters is in a process of extracting a source signal.

* * * * *